(12) United States Patent
Sato et al.

(10) Patent No.: US 7,587,503 B2
(45) Date of Patent: Sep. 8, 2009

(54) CONTENT REPRODUCTION APPARATUS, AND CONTENT REPRODUCTION METHOD

(75) Inventors: Hideaki Sato, Yokohama (JP);
Toshinari Takahashi, Minato-ku (JP);
Tooru Kamibayashi, Chigasaki (JP);
Toshimitsu Kaneko, Kawasaki (JP);
Haruhiko Toyama, Kawasaki (JP);
Hideki Mimura, Yokohama (JP);
Yasufumi Tsumagari, Yokohama (JP);
Yasuhiro Ishibashi, Ome (JP); Takero Kobayashi, Akishima (JP); Seiichi Nakamura, Inagi (JP); Eita Shuto, Minato-ku (JP); Kazuhiko Taira, Yokohama (JP); Yoichiro Yamagata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 499 days.

(21) Appl. No.: 11/471,456

(22) Filed: Jun. 20, 2006

(65) Prior Publication Data

US 2006/0242263 A1    Oct. 26, 2006

Related U.S. Application Data

(63) Continuation of application No. PCT/JP2006/302566, filed on Feb. 8, 2006.

(30) Foreign Application Priority Data

Feb. 18, 2005 (JP) ............................ 2005-042282

(51) Int. Cl.
*G06F 15/16* (2006.01)

(52) U.S. Cl. .................. 709/229; 709/203; 709/217; 709/219; 713/193

(58) Field of Classification Search .................. 709/203, 709/217–219, 225–226, 229; 713/193
See application file for complete search history.

(56) References Cited

U.S. PATENT DOCUMENTS

| 6,873,975 | B1 * | 3/2005 | Hatakeyama et al. | ........ 713/193 |
| 7,010,582 | B1 * | 3/2006 | Cheng et al. | ................. 709/219 |
| 7,073,073 | B1 * | 7/2006 | Nonaka et al. | ............... 713/193 |
| 7,191,238 | B2 * | 3/2007 | Uchida | ........................ 709/229 |

(Continued)

FOREIGN PATENT DOCUMENTS

JP           11-161663          6/1999

(Continued)

OTHER PUBLICATIONS

International Search Report for PCT/JP2006/302566 dated Jun. 20, 2006.

(Continued)

*Primary Examiner*—Bharat N Barot
(74) *Attorney, Agent, or Firm*—Turocy & Watson, LLP

(57) ABSTRACT

A content reproduction apparatus including reproduction unit configured to reproduce content data item stored in recording medium storing first server identifier and content data item including destination identifier, reads first server identifier from recording medium, to store first server identifier in table, certifies first server corresponding to first sever identifier, receives first server policy from first server being certified, first server policy including second server identifier redirecting to second server, to store second server identifier in table, certifies second server, acquires destination identifier while reproduction unit reproduces content data item, determines whether destination identifier being acquired is equal to first identifier stored in table, and accesses to second server, when at least destination identifier is equal to first identifier and second server is certified.

13 Claims, 11 Drawing Sheets

U.S. PATENT DOCUMENTS

| | | | |
|---|---|---|---|
| 7,222,162 B2 * | 5/2007 | Lee et al. | 709/217 |
| 7,353,250 B2 * | 4/2008 | Chung et al. | 709/203 |
| 7,386,587 B2 * | 6/2008 | Chung et al. | 709/203 |
| 7,424,613 B2 * | 9/2008 | Han et al. | 713/168 |
| 7,471,410 B2 * | 12/2008 | Sato et al. | 709/229 |
| 7,487,549 B2 * | 2/2009 | Kawamoto et al. | 713/193 |
| 2003/0152366 A1 | 8/2003 | Kanazawa et al. | |
| 2004/0096186 A1 | 5/2004 | Tsumagari et al. | |
| 2004/0126095 A1 | 7/2004 | Tsumagari et al. | |
| 2006/0212697 A1 | 9/2006 | Sato et al. | |

FOREIGN PATENT DOCUMENTS

| | | |
|---|---|---|
| JP | 2004-079055 | 3/2004 |

OTHER PUBLICATIONS

Written Opinion for PCT/JP2006/302566 dated Jun. 20, 2006.

* cited by examiner

| Domain name | Redirect | Server certification flag | Disk certification flag |
|---|---|---|---|
| www.sample1.com | | 1 | |
| | | | |
| | | | |

| Type | Value |
|---|---|
| Redirect | 1 |
| Protocol/port number | TCP : 21/UDP : 111 |
| Disk certification | 0 |

|     | Domain name | Redirect | Server certification flag | Disk certification flag |
|-----|-------------|----------|---------------------------|-------------------------|
| (a) | www.sample1.com | 1 | 1 | 0 |
| (b) | www.sample2.com | 1 | 1 | 0 |
| (c) | www.sample3.com | 0 | 1 | 1 |

FIG. 13

| Type | Value |
|------|-------|
| Redirect | 0 |
| Protocol/port number | TCP : 21/UDP : 111 |
| Disk certification | 1 |

FIG. 14

CONTENT REPRODUCTION APPARATUS, AND CONTENT REPRODUCTION METHOD

CROSS REFERENCE TO RELATED APPLICATIONS

This is a Continuation Application of PCT Application No. PCT/JP2006/302566, filed Feb. 8, 2006, which was published under PCT Article 21(2) in English.

This application is based upon and claims the benefit of priority from prior Japanese Patent Application No. 2005-042282, filed Feb. 18, 2005, the entire contents of which are incorporated herein by reference.

BACKGROUND OF THE INVENTION

1. Field of the Invention

The present invention relates to a content reproduction apparatus which reproduces and executes content data including video/audio information and a program recorded in a recording medium such as an optical disk, and more particularly, it relates to a content reproduction apparatus which accesses a server via a network.

2. Description of the Related Art

In recent years, there have been developed optical disk reproduction apparatuses to reproduce optical disks such as DVDs and video CDs in which data such as video and audio are recorded. These apparatuses are utilized in viewing movie software and the like, and they generally prevail.

The DVD is a specification concerning a disk which reproduces video/audio information recorded in an information recording medium, and has been issued as "DVD Specifications for Read-Only disk Part 3: VIDEO SPECIFICATIONS" by DVD Forum in 1996. In this specification, an MPEG 2 system is supported as a moving image compression system, and an MPEG audio compression system and an AC-3 audio compression system are supported as audio compression systems. Furthermore, there are defined: sub-video data which is bitmap data for use in a movie subtitle or the like; and control data (navigation pack) of quick forward reproduction, quick return reproduction or the like.

On the other hand, in recent years, with the prevalence of the Internet, there has been developed a video information device having a network access function. For example, in the video information device having a function of receiving and recording television broadcasting, there is developed a function of receiving data of an electronic program table from a server accessed via a network, and recording the broadcasting based on contents of the data.

As a conventional technology concerning the video information device having the network access function, there is disclosed an image display device which provides a service constituted of a DVD video title and an HTML file provided via the Internet in Document 1 (Jpn. Pat. Appln. KOKAI Publication No. 11-161663). In this image display device, it is possible to access the Internet based on URL taken out of the navigation pack and display an HTML content in conjunction with a scene being reproduced.

Moreover, in Document 2 (Jpn. Pat. Appln. KOKAI Publication No. 2004-79055), there is disclosed an optical disk device which not only displays the HTML content but also reproduces video having a high representation capability in accordance with extension information acquired from the server accessed via a communication circuit and which sends data in an optical disk to the server to perform certification processing so that the unspecified number of people cannot access the server.

However, in Document 1, there is not investigated a security problem caused when the content is acquired via the network. In Document 2, the certification processing is simply performed in order to limit the optical disk devices which can access the server, and there is no consideration of: a problem concerning a danger of acquiring a dangerous content maliciously prepared by the server of a destination; or a problem concerning a danger that the optical disk device becomes a steppingstone for an attack of distributed denial of service (DDoS), when the maliciously prepared dangerous content is reproduced. In the document, the security is insufficiently investigated.

As described above, in the conventional video information device having the network access function, the disk is certified to simply assure validity of the disk in order to limit the video information device which can access the server. Therefore, there is no consideration of: the problem concerning the danger of acquiring the dangerous content maliciously prepared by the server of the destination; or the problem concerning the danger that the video information device becomes the steppingstone for the DDoS attack or the like, when the maliciously prepared dangerous content is reproduced, and there is a problem that it is not possible to access the network with security.

Therefore, in view of the above-described problems, an object of the present invention is to provide a content reproduction apparatus and method capable of controlling: the limiting of the server to be accessed during the reproduction or the execution of the disk to the server; the limiting of the method of accessing the server; the limiting the disk accessible to the server to the disk which is determined to be valid; or the like. In consequence, it is possible to avoid the access to the illegal network in a case where the tampered program in the disk is executed.

BRIEF SUMMARY OF THE INVENTION

According to embodiments of the present invention, a content reproduction apparatus including a reproduction unit configured to reproduce a content data item stored in a recording medium storing a first server identifier and the content data item including a destination identifier; reads the first server identifier from the recording medium, to store the first server identifier in a table; certifies a first server corresponding to the first sever identifier; receives a first server policy from the first server being certified, the first server policy including a second server identifier redirecting to a second server, to store the second server identifier in the table; certifies the second server; acquires the destination identifier while the reproduction unit reproduces the content data item; determines whether the destination identifier being acquired is equal to the first identifier stored in the table; and accesses to the second server, when at least the destination identifier is equal to the first identifier and the second server is certified.

BRIEF DESCRIPTION OF THE SEVERAL VIEWS OF THE DRAWING

FIG. 13 is a diagram showing one example of the destination management table stored in the destination management unit after the redirect is performed twice; and FIG. 14 is a diagram showing a storage example of the server policy acquired from the server that is designated as a destination on second redirect.

DETAILED DESCRIPTION OF THE INVENTION

An embodiment of the present invention will be described hereinafter with reference to the drawings.

Figure 1:
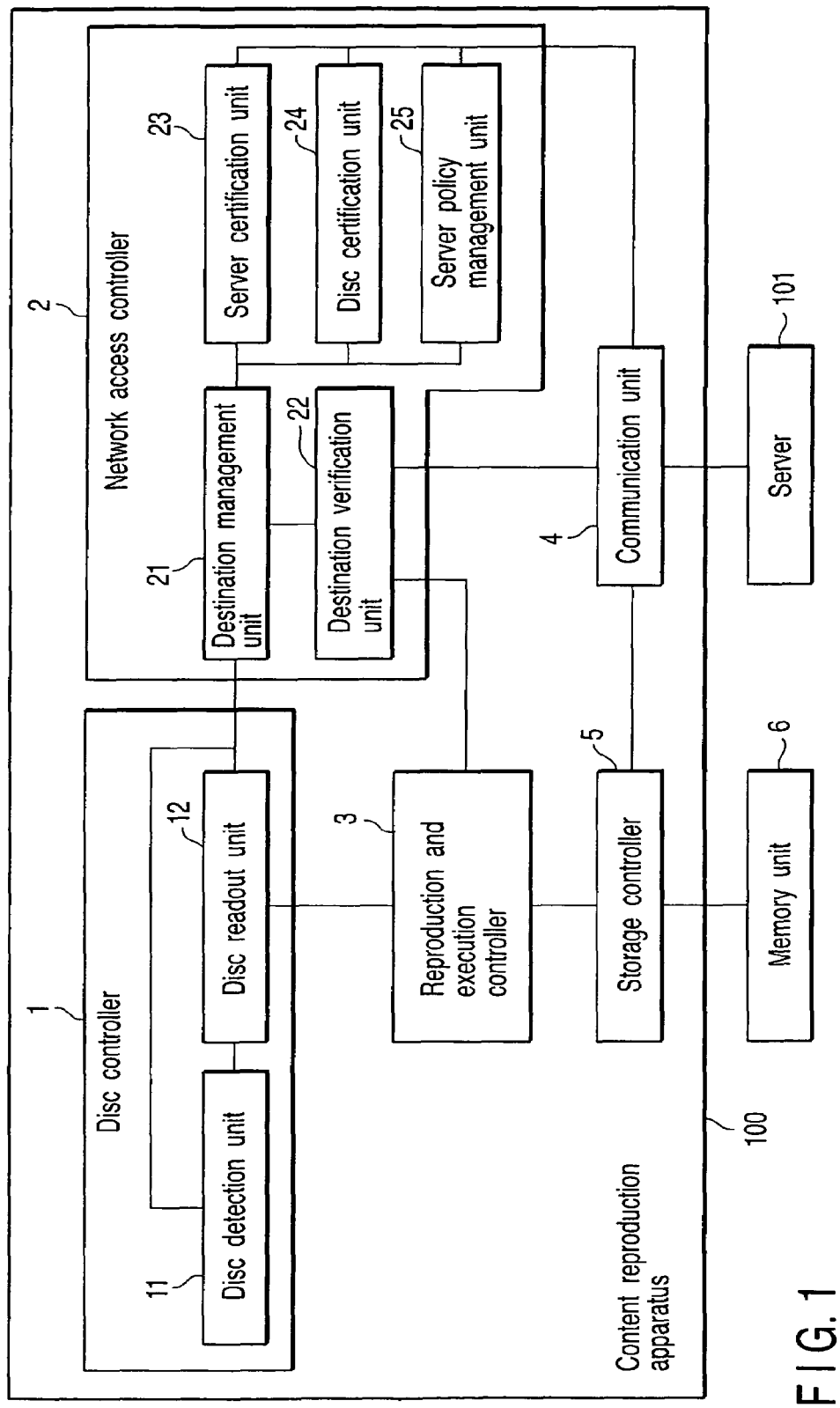
FIG. 1 is a diagram showing a constitution example of a content reproduction apparatus in an embodiment of the present invention.

FIG. 1 shows a constitution example of a content reproduction apparatus which reproduces content data recorded in a recording medium in one embodiment of the present invention. Here, there will be described the content reproduction apparatus which reproduces the content data recorded in a disk in a case where the recording medium is a disk such as an optical disk.

In the disk, there is recorded the content data including video/audio data, executable program (script) in which a series of processing procedure is described using a language such as an extensible markup language (XML) or the like. The disk in which the content data is recorded is inserted into the content reproduction apparatus, and the content reproduction apparatus has a function of reproducing the video/audio data recorded in the disk, a function executing the program, and a function of accessing a predetermined network such as Internet. The program recorded in the disk includes an identifier (e.g., domain name) of the server of the destination, a type or a port number of a communication protocol for use in communicating with the server, and program including processing to connect the content reproduction apparatus to the server. According to the program stored in the disk, data, program or the like for use in reproducing the video/audio data is downloaded from the server (the server corresponds to the identifier included in the program, and this server corresponds to the identifier stored in a specific area of the disk, if the disk is valid).

In the present embodiment, one server on a network is assigned to each type (each content title) of the content data recorded in the valid recording medium (disc) provided from a distributor who sell or supply the recording medium. That is, the type of content data recorded in the valid disk has a one-to-one correspondence with the server. The identifier (e.g., the domain name here) of the server corresponding to the content data recorded in the disk is recorded in a predetermined specific area of the disk.

Moreover, one server corresponds to the type of content data in one case, and a plurality of servers corresponds to the type. In the latter case, the identifiers of the plurality of servers are recorded in the specific area of the disk.

When the content data (including the program) in the disk is not tampered, and the server whose identifier stored in the specific area of the disk is valid, the identifier of the server stored in the specific area in the valid disk (that is not tampered) indicates the predetermined server corresponding to the content data in the disk, and the identifier of the server of the destination included in the program in the disk is equivalent to the identifier (any of a plurality of identifiers in a case where they are stored) stored in the specific area of the disk.

<Constitution>

As shown in FIG. 1, the content reproduction apparatus includes a disk controller 1, a network access controller 2, a reproduction and execution controller 3, a communication unit 4, and a storage controller 5.

The disk controller 1 detects that the disk has been inserted, and reads information recorded on the disk. The reproduction and execution controller 3 reproduces or executes video/audio data or program read by the disk controller 1. The communication unit 4 communicates with a server via a network.

The network access controller 2 controls access to a server 101 corresponding to the disk (content data recorded in the disk) being reproduced by the reproduction and execution controller 3, and performs server certification (described later), management of a server policy (described later), and disk certification (described later). The network access controller 2 includes a destination management unit 21, a destination verification unit 22, a server certification unit 23, a disk certification unit 24, and a server policy management unit 25.

The storage controller 5 performs a control for storing data (including the video/audio data, the program, etc.) acquired from the disk inserted into the content reproduction apparatus or a network (server 101) in a predetermined memory unit 6.

A processing operation of the content reproduction apparatus of FIG. 1 will be described hereinafter.

In the present embodiment, one-to-one correspondence is established between the type of content data recorded in a valid disk and the server. A domain name of the server corresponding to the content data recorded in the disk is recorded in a predetermined specific area of the disk.

To limit the server which can be accessed at a time when the content reproduction apparatus reproduces the disk to the only server corresponding to the domain name stored in the specific area of the disk, the content reproduction apparatus performs the server certification in order to determining whether or not the server is a valid server corresponding to the domain name stored in the specific area in the disk before accessing the server.

Moreover, after performing the server certification, the content reproduction apparatus performs the disk certification for determining whether the disc is valid or not, in response to a request from the server (according to a server policy), in order to prevent the content reproduction apparatus from executing the program to access an illegal server in a case where the content data (to be more precise, program included in the content data) recorded in the disk is tampered.

Furthermore, in the present embodiment, the content reproduction apparatus acquires, from the server determined to be valid by the server certification, a server policy (redirect) to designate the server to be accessed during the reproduction or the execution of the content data or the program recorded in the disk; a server policy to designate a method (type of communication protocol, a port number or the like) of accessing the server to be accessed during the reproduction or the execution of the content data or the program recorded in the disk; a server policy indicating that the disk accessible to the server is limited to the disk determined to be valid or the like. In accordance with the acquired server policy, the apparatus performs redirecting, restriction on the method of accessing the server, and control such as the disk certification.

The server policy acquired from the server determined to be valid indicates a policy for the server to permit the access.

The server certification and the acquisition of the server policy are performed, when the disk is inserted into the content reproduction apparatus, or when a request for accessing the server (network) is (first) occurred and detected (e.g., by executing the program recorded in the disk) after the disk is inserted into the content reproduction apparatus.

(1) There will be described a case where the server certification and the acquisition of the server policy are performed at a time when the disk is inserted into the content reproduction apparatus with reference to a flowchart shown in FIG. 2.

(1-1) Server Certification

Figure 2:
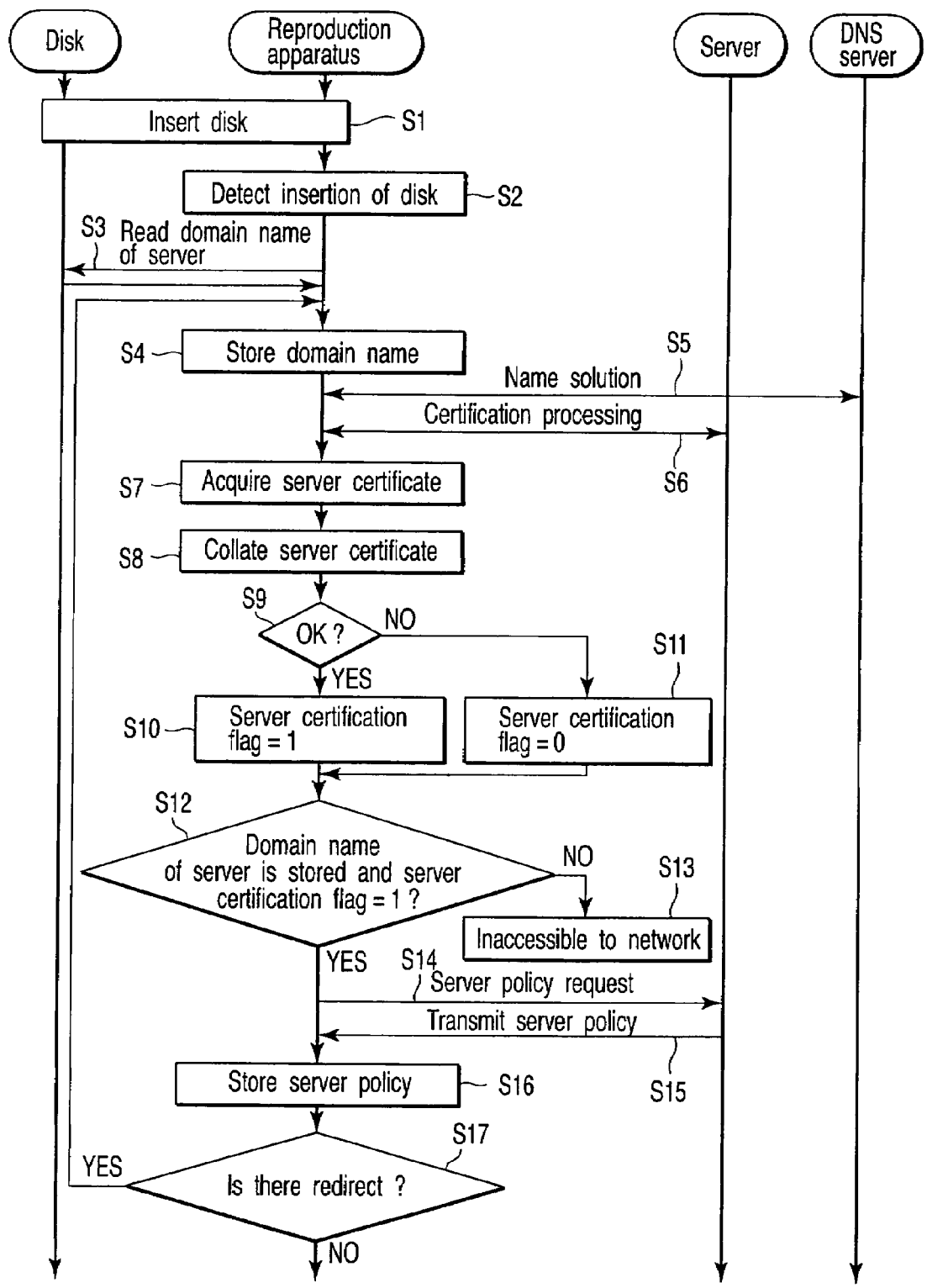
FIG. 2 is a flowchart showing a server certification processing operation (server certification performed at a time when a disk is inserted)
Figures 10, 11, 12:
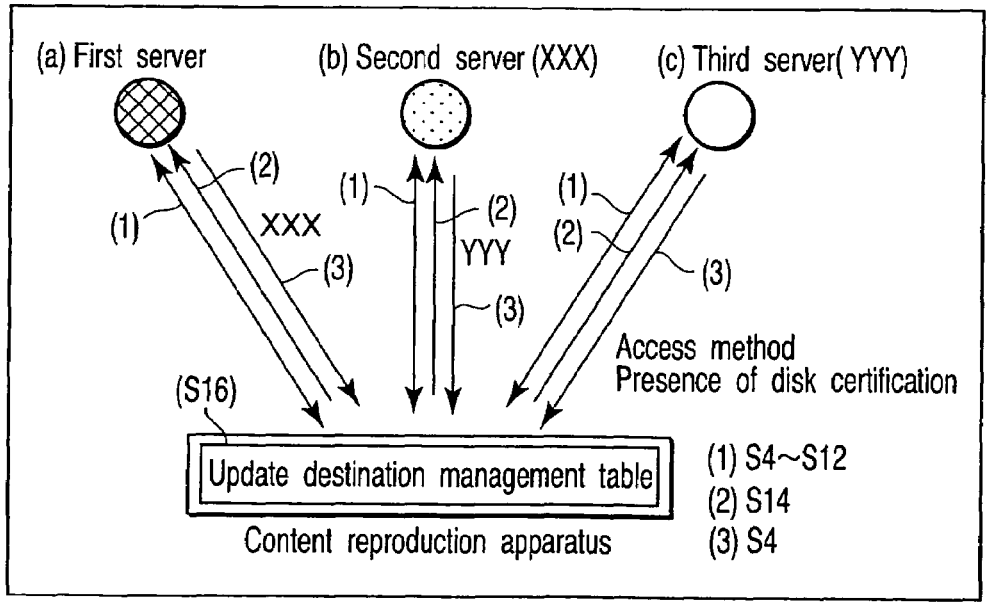
FIG. 10 is a diagram showing one example of a destination management table stored in a destination management unit.
FIG. 11 is a diagram showing one example of a table which stores a server policy.
FIG. 12 is an explanatory view of a redirect processing.

As shown in FIG. 2, when the disk is inserted into a content reproduction apparatus 100 (step S1), a disk detection unit 11 detects that the disk has been inserted (step S2). On detecting the insert of the disc, a disk readout unit 12 reads the domain name of the destination from the predetermined specific area of the disk (step S3). The read domain name is notified to the destination management unit 21 of the network access controller 2. The destination management unit 21 records the notified domain name in a destination management table stored in a memory of the destination management unit 21 as shown in FIG. 10 (step S4).

It is to be noted that in a case where data (e.g., "0") indicating that the domain name is vacant is stored in the specific area of the disk, the server certification is not performed. Therefore, even in a case where a request for access to the network is thereafter occurred when the disk is reproduced, the network is not accessed.

The destination management unit 21 stores the domain name in the destination management table only while the disk is inserted into the content reproduction apparatus 100. Therefore, when the disk detection unit 11 detects that the disk is taken out, the destination management unit 21 deletes the domain name stored in the step S4 from the destination management table shown in FIG. 10.

Additionally, when the domain name read from the specific area of the disk is stored in the destination management table in the step S4, the server certification unit 23 starts certification processing of the server corresponding to the domain name. In this case, the communication unit 4 first acquires an IP address corresponding to the domain name from a predetermined domain name system (DNS) server (step S5). The server certification unit 23 accesses the network by use of this acquired IP address to perform the certification processing for acquiring the certificate of the server corresponding to the domain name (step S6).

A method to certify the server via the network is operated by a secure socket layer (SSL)/transport layer security (TLS) broadly used in, for example, a worldwide web (WWW) and the like on the Internet. The SSL/TLS is a certification method based on a public key cryptograph system. In the system, a client receives the server certificate certified by a certification institution called Route Certification Agency, and confirms contents of the certificate to thereby assure validity of the server. Furthermore, the SSL/TLS defines a processing procedure in which the data is encrypted by both of the client and the server to perform the communication, and the data can be prevented from being tampered by tapping on the network.

Figure 3:
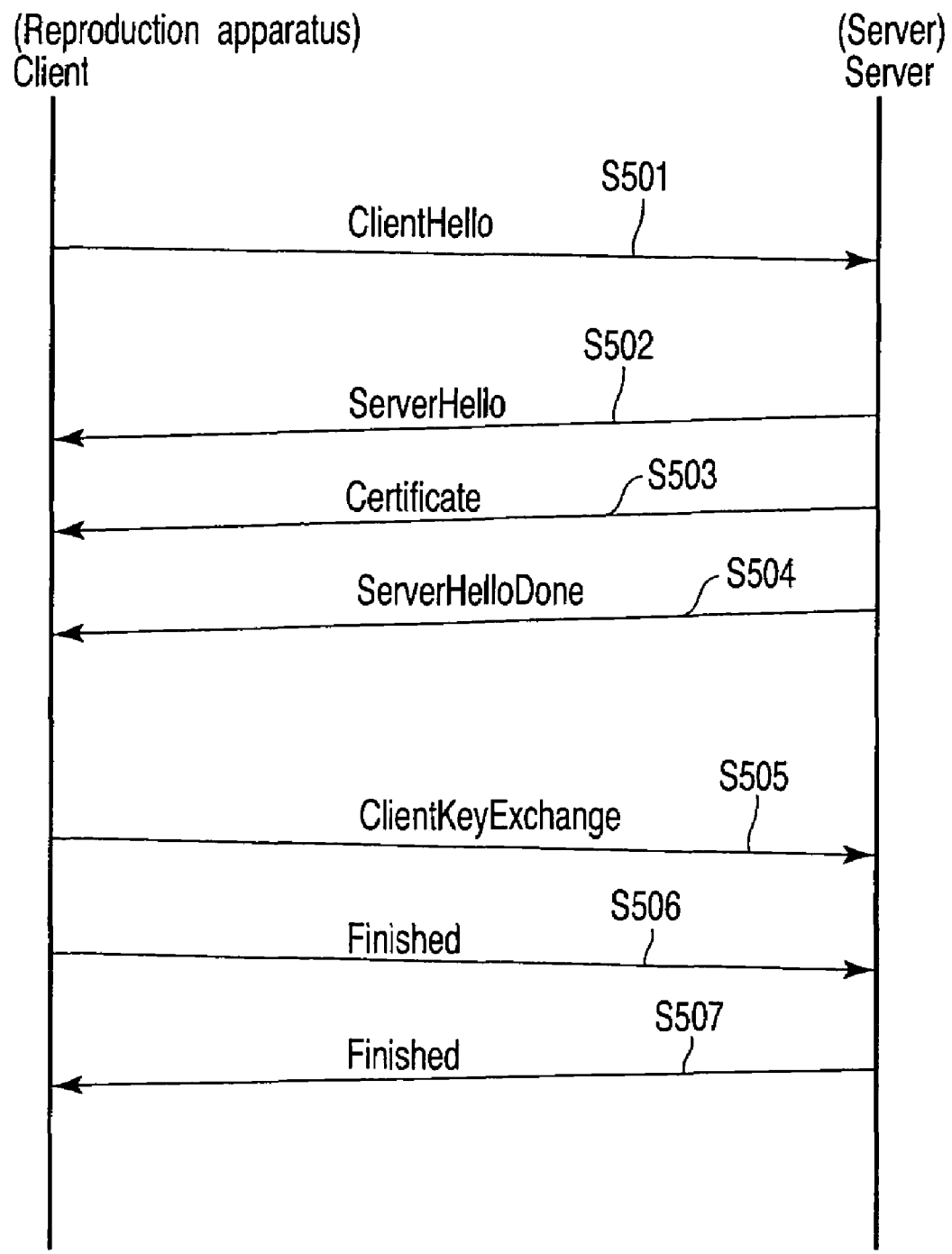
FIG. 3 is a diagram showing one example of a certification procedure for use in the server certification.

In the SSL/TLS, a method is defined to exchange the certificate in a procedure shown in FIG. 3. That is, ClientHello message including a list of usable cryptograph algorithms and the like is transmitted from the client (content reproduction apparatus 100) to the server (server 101) (step S501). Next, the server transmits, to the client, ServerHello message including information the cryptograph algorithm to be used among the cryptograph algorithms of the list (step S502). Thereafter, Certificate message including the server certificate is transmitted to the client (step S503), and ServerHelloDone message is transmitted, thereby ending the transmission of the certificate (step S504).

The client encrypts a common key by use of the public key of the server acquired from the certificate transmitted from the server, and transmits, to the server, ClientKeyExchange message including the encrypted common key (step S505). Next, a digest of the messages up to now is calculated, and Finished message including the digest is transmitted to the server in order to prevent the messages from being tampered (step S506). On the other hand, the server acquires the common key, and calculates the digest of the messages in the same manner as in the client to transmit the digest to the client (step S507).

In FIG. 3, the content reproduction apparatus 100 is regarded as the client, and the content reproduction apparatus 100 acquires the certificate (server certificate) of the server corresponding to the domain name read from the specific area of the disk in step S503 (step S7). An accessed server name (domain name) is collated with the server name included in the server certificate acquired from the server 101 (step S8). When both of the names agree with each other, and the certification of the server is successful, it is determined that the server 101 is a valid server corresponding to the domain name stored in the specific area of the disk inserted in the content reproduction apparatus 100. When the accessed server name does not agree with the server name included in the server certificate acquired from the server 101, it is determined that the server is not valid.

The server certification unit 23 records a value of a server certification flag indicating whether the server is determined to be valid or not in the destination management table stored in the destination management unit 21 and shown in FIG. 10. When the server is determined to be valid (step S9), the server certification flag is set to "1" (step S10). When the server is determined net to be valid (step S10), the server certification flag is set to "0" (step S11).

When the server certification flag indicates "1", it is indicated that the server 101 is valid. Therefore, when the validity of the server cannot be confirmed, the server certification flag is reset to "0". For example, in a case where a communication session is cut from the server determined to be valid, or a predetermined time has elapsed, the server certification unit 23 rewrites the server certification flag from "1" to "0".

The certification processing of the step S6 of FIG. 2 may be unique certification processing based on a public key cryptograph system instead of the SSL/TLS. A processing procedure in this case will be described.

First, the disk readout unit 12 of the disk controller 1 reads the public key stored beforehand in the disk to store the key in a predetermined memory. Next, the server certification unit 23 requests the server to transmit the certificate. On receiving the request, the certificate is encrypted by means of a secret key owned by the server, and transmitted to the content reproduction apparatus. On receiving the certificate, the server certification unit 23 decrypts the certificate by means of the public key, and collates the server name included in the decrypted certificate with the accessed server name. When both of them agree with each other, and the server certification is successful, it is determined that the server 101 is a valid server corresponding to the domain name stored in the specific area of the disk inserted in the content reproduction apparatus 100, and the server certification flag "1" is stored. When the accessed server name does not agree with the server name included in the decrypted certificate, it is determined that the server is nor valid, and the server certification flag "0" is stored.

For example, when the domain name of the server is included in the server certificate, it can be confirmed that the valid server is accessed.

In a case where the above-described server is determined not to be valid, even when the request for access to the network is occurred while the content reproduction apparatus is reproducing the content in the disk, the network is not accessed.

When the above-described server certification is successful, it is determined that the server is the valid server corresponding to the domain name recorded in the specific area of the disk, and the server accessible to the content reproduction apparatus can be limited to the server corresponding to the domain name stored in the destination management table.

When the server certification becomes successful and the server is determined to be valid, next the server policy management unit 25 performs server policy acquisition processing for acquiring a server policy from the server determined to be valid (server whose domain name is stored in the destination management table). When there is a redirect request for access to another server as the server policy, redirect processing described later is performed. When there is a request for disk certification as the server policy, the disk certification is performed as described later. There will be described hereinafter server policy acquisition processing.

(1-2) Acquisition of Server Policy

As to the server whose domain name is stored in the destination management table, when the server certification is completed, and the server determined to be valid (when the server certification becomes successful and server certification flag is "1") (step S12 of FIG. 2), the server policy management unit 25 of the network access controller 2 transmits a server policy request message to the server via the communication unit 4 in order to acquire the server policy (step S14).

It is to be noted that in a case where the server domain name is not stored in the destination management table, and the server certification flag is "0", the network is not thereafter accessed (step S13).

On receiving the server policy request transmitted in the step S14, the server transmits, to the content reproduction apparatus, the server policy indicating a policy to permit the access (e.g., at least one of a plurality of server policies such as: a server policy to permit the access from the disk determined to be valid by the disk certification (a server policy toward the disk certification); a server policy to designate an access method to the server, such as communication protocol or port number, and permit access by the designated access method (server policy toward an access method); and a server policy to designate another server, and instruct re-access to the server (server policy toward the redirect) (step S15).

On receiving the server policy, the server policy management unit 25 analyzes the contents, and stores the contents for each item in a server policy table as shown in FIG. 11 (step S16). The server policy management unit 25 performs a control in accordance with the server policy stored in the stored server policy table. In the present embodiment, there will be described hereinafter in detail: the server policy to permit the access from the disk determined to be valid by the disk certification (the server policy to request the disk certification); the server policy to designate an access method to the server, such as the communication protocol or the port number, and permit the access by the designated access method (the server policy to designate access method); and the server policy to designate the other server, and instruct the re-access (redirect) to the server (the server policy to request the redirect).

(1-3) Access to Other Server (Redirect Processing)

There will be described processing in a case where the instruction for the access to the other server, or the (the server policy to request the redirect is returned from the server by the server policy acquisition processing with reference to FIGS. 2 and 12.

The server policy to request the redirect is returned from the previous server, in a case where the domain name of the original server is recorded in the specific area of the recording medium, and the recording medium is distributed, but thereafter the server having the domain name is moved, and the domain name is changed to another domain name; or a case where the moved server is further moved to another server.

In FIG. 12(*a*), on acquiring the server policy from the server (first server) corresponding to the domain name stored in the specific area of the disk (step S15 of FIG. 2), the server policy management unit 25 stores the server policy in the server policy table (step S16 of FIG. 2). When the acquired server policy includes the domain name of another server (second server), and the server policy to instruct the access to the second server (redirect destination server) corresponding to the domain name (step S17 of FIG. 2), the domain name of the second server included in the server policy is added to a domain name column of the destination management table (step S4 of FIG. 2).

It is to be noted that in this case, the server policy acquired from the first server may include a server policy indicating that the disk certification is unnecessary, and a server policy indicating that there is not any designation of the access method. Alternatively, among the server policies toward the disk certification, the access method, and the redirect, the only server to request to redirect to the second server domain name may be included.

Next, as shown in FIG. 12(*b*), the server certification unit 23 accesses the server corresponding to the newest domain name in the destination management table, that is, the second server, and performs the server certification processing in the same manner as in the steps S5 to S11 of FIG. 2. Thereafter, when the second server determined to be valid (step S12), the server policy management unit 25 acquires the server policy from the second server (steps S14 and S15 of FIG. 2), and this policy is stored in the server policy table of the server policy management unit 25 (step S16).

When the server policy acquired from the second server includes the server policy to request to redirect to still another server (third server) (step S17 of FIG. 2), the server policy management unit 25 adds the domain name of the third server included in the server policy to the domain name column of the destination management table (step S4 of FIG. 2).

Moreover, as shown in FIG. 12(*c*), the server certification unit 23 accesses the third server corresponding to the newest domain name in the destination management table, and performs the server certification processing in the same manner as in the steps S5 to S11 of FIG. 2. Thereafter, when the server certification becomes successful with respect to the other server (step S12), the server policy management unit 25 acquires the server policy from the third server (steps S14 and S15 of FIG. 2), and stores the server policy of the third server in the server policy table of the server policy management unit 25 (step S16).

It is to be noted that when the server policy acquired from the second server does not include the server policy toward the redirect, that is, when the server policy to request or instruct the access to still another server (third server) is not included (step S17 of FIG. 2), needless to say, the subsequent access to the third server, the server certification of the third server, the acquisition processing of the server policy or the like is not performed.

Moreover, in the destination management table in a case where the redirecting is performed twice as shown in FIGS. 12(a) to (c), as shown in FIG. 13, there are stored: the domain names of the first to third servers; the presence of the redirect ("1" in a case where there is the redirect, "0" in a case where there is not the redirect); and the server certification flag indicating success/failure in the server certification processing of the steps S5 to S11 of FIG. 2.

It is to be noted that in FIG. 12(a), the server policy acquired from the first server is a server policy to request the redirect to the second server, and the server policy to request the disk certification or the server policy to designate the access method is not acquired. Therefore, the disk certification is not performed (see FIG. 13(a)).

Similarly, in FIG. 12(b), the server policy acquired from the second server is a server policy to request the redirect to the third server, and the server policy to request the disk certification or the server policy to designate the access method is not acquired. Therefore, the disk certification is not performed (see FIG. 13(b)).

In FIG. 12(c), the server policy acquired from the third server is not the server policy to request the redirect, and the server policy to request the disk certification and the server policy to designate the access method are acquired. Therefore, the disk certification is performed, and the disk certification flag indicates "1" (see FIG. 13(c)).

FIG. 14 shows one example of the server policy acquired from the third server and stored in the server policy table in a case where the redirecting is performed twice as shown in FIGS. 12(a) to (c).

As shown in FIG. 14, the redirect is not required, as to the access method, port number "21" is designated in a case where the protocol is TCP, and port number "111" is designated in a case where the protocol is UDP in the server policy acquired from the third server. Moreover, the server policy requiring the disk certification is included.

It is to be noted that in a case where the server policy requests the redirect, "1" is stored in item "redirect" of the server policy table. In a case where the server policy indicates that the redirect is not required or unnecessary, "0" is stored in the item "redirect" of the server policy table.

Moreover, when the server policy requires the disk certification, "1" is stored in item "disk certification" of the server policy table. When the server policy indicates that the disk certification is unnecessary, "0" is stored in the item "disk certification" of the server policy table.

(1-4) Limiting of Number of Redirecting Times

In the redirect processing, since the content reproduction apparatus 100 access to the server designated by the server policy to request the redirect, without any condition, redirect of server to be accessed might continue many times. For example, in a situation in which after first accessing the first server, the second server is redirected to the third server, the redirecting continues infinitely. To avoid such problem, the number of redirecting times (the number of server policies to request the redirect received from servers determined to be valid) is limited. A method of limiting the number of redirecting times will be described with reference to a flowchart of FIG. 4. It is to be noted that in FIG. 4, the same part as that of FIG. 2 is denoted with the same reference numeral, and an only different part will be described.

Figure 4:
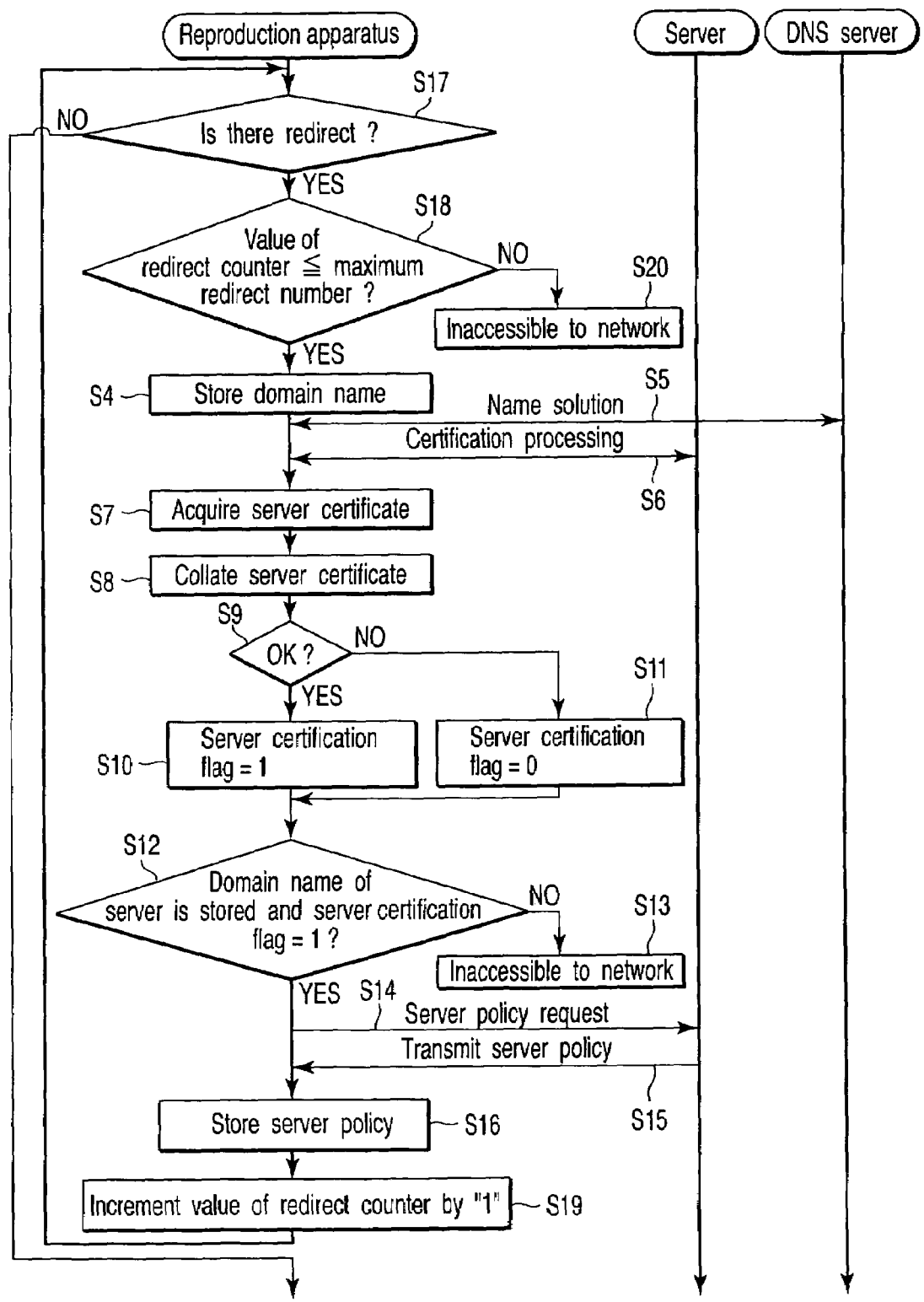
FIG. 4 is a flowchart showing a method of limiting the number of redirecting times.

On acquiring the acquired server policy to request the redirect to a new domain name (a new server) in step S17 of FIG. 4 corresponding to the step S17 of FIG. 2, a value of the redirect counter included in the server policy management unit 25 holding the number of redirecting times after the disk is inserted is compared with a maximum redirect number held beforehand in the server policy management unit 25 (step S18 of FIG. 4). When the value of the redirect counter is not more than the maximum redirect number, the new domain name designated is added to the destination management table (step S4 of FIG. 4), and the new server corresponding to the new domain name is accessed (steps S5 to S16). After the new server is determined to be valid, and the server policy is acquired from the new server, the value of the redirect counter is incremented by "1" (step S19). When the value of the redirect counter exceeds the maximum redirect number in the step S18, the new server is not accessed, the destination management table and the server policy table are cleared, and network is not accessed (step S20).

(1-5) Disk Certification

In the disk certification, it is checked whether or not the content data recorded in the disk inserted in the content reproduction apparatus 100 is valid. When the disk certification is performed, it is possible to avoid the access to valid server by executing the tampered program included in the tampered content data is recorded in the disk.

The disk certification is performed when the server policy to request the disc certification is acquired from the server which has succeeded in the server certification and determined to be valid, in processing of steps S14 to S16 of FIG. 2 or 4.

The disk certification processing will be described hereinafter with reference to a flowchart of FIG. 5.

After the server certification shown in FIG. 2 becomes successful, and the server policy is acquired, there is a request for the disk certification (a value corresponding to the item "disk certification" of the server policy table is "1"). In this case, the disk certification unit 24 checks whether or not the domain name is stored in the destination management table, and whether or not the server certification is successful (step S21). When the domain name is not stored in the destination management table and/or the server certification flag indicates "0" (step S21), the subsequent disk certification processing is not performed. Therefore, it is not possible to access the network (step S22).

When the domain name is stored in the destination management table, and the server certification flag indicates "1" (step S21), the request for disk certification is transmitted to the server corresponding to the domain name stored in the destination management table via the communication unit 4 (step S23).

The server which has received the disk certification request selects at random a recording area of the disk in which data capable of identifying the disk is recorded (step S24). Here, not only one but also a plurality of recording areas may be selected. Moreover, the content reproduction apparatus 100 is requested to transmit a hash value of the data recorded in the selected recording area (step S25). In this case, the value may be requested to be encrypted by use of a predetermined algorithm before transmitted.

When the content reproduction apparatus 100 receives this transmission request, the disk certification unit 24 reads the data of the recording area designated by the server from the disk via the disk controller 1 (step S26), and calculates the hash value of the read data (step S27). The obtained hash value is transmitted to the server (step S28).

The server is provided with a valid disk in which the content data corresponding to the server is recorded. The server which has received the hash value reads the data from the recording area of the disk selected in the step S24 to calculate the hash value. Moreover, this calculated hash value is compared with the hash value received from the content reproduction apparatus 100 (step S29). When both of them disagree (disk certification fails), it is determined that the content data recorded in the disk presently inserted in the content reproduction apparatus might be tampered and the disc is not valid. In this case, the server transmits an access non-permission notice to the content reproduction apparatus 100 (step S31).

When the hash value calculated by the server agrees with the hash value received from the content reproduction apparatus 100 (disk certification is successful), it is determined that the content data recorded in the disk presently inserted in the content reproduction apparatus is not tampered and the disc is valid. In this case, the server transmits an access permission notice to the content reproduction apparatus 100 (step S33).

When the content reproduction apparatus 100 receives the access permission notice/access non-permission notice from the server, the disk certification unit 24 records, in the destination management table stored in the destination management unit 21 shown in FIG. 13, the value of the disk certification flag indicating whether or not the disk is valid or the certification is successful based on the received notice. When the disk is determined to be valid and the access permission notice is received, the disk certification flag is set to "1" (step S34). When the disc is determined not to be valid and the access non-permission notice is received, the disk certification flag is set to "0" (step S32).

In the disk certification processing described above, the server selects at random, from the disk in which the content data corresponding to the server is recorded, the recording area in which the data capable of identifying the disk is recorded, and it is determined whether or not the data in the recording area is tampered by use of the hash value of the data of the selected recording area transmitted from the content reproduction apparatus 100.

There will be described another disk certification processing using data (program) in the recording area of the disk in which the program having a possibility of harming another program if tampered is recorded instead of performing the disk certification by use of the data in an arbitrary recording area of the disk, with reference to a flowchart shown in FIG. 6. It is to be noted that in FIG. 6, the same parts as that of FIG. 5 is denoted with the same reference numeral, and an only different part will be described.

Figure 5:
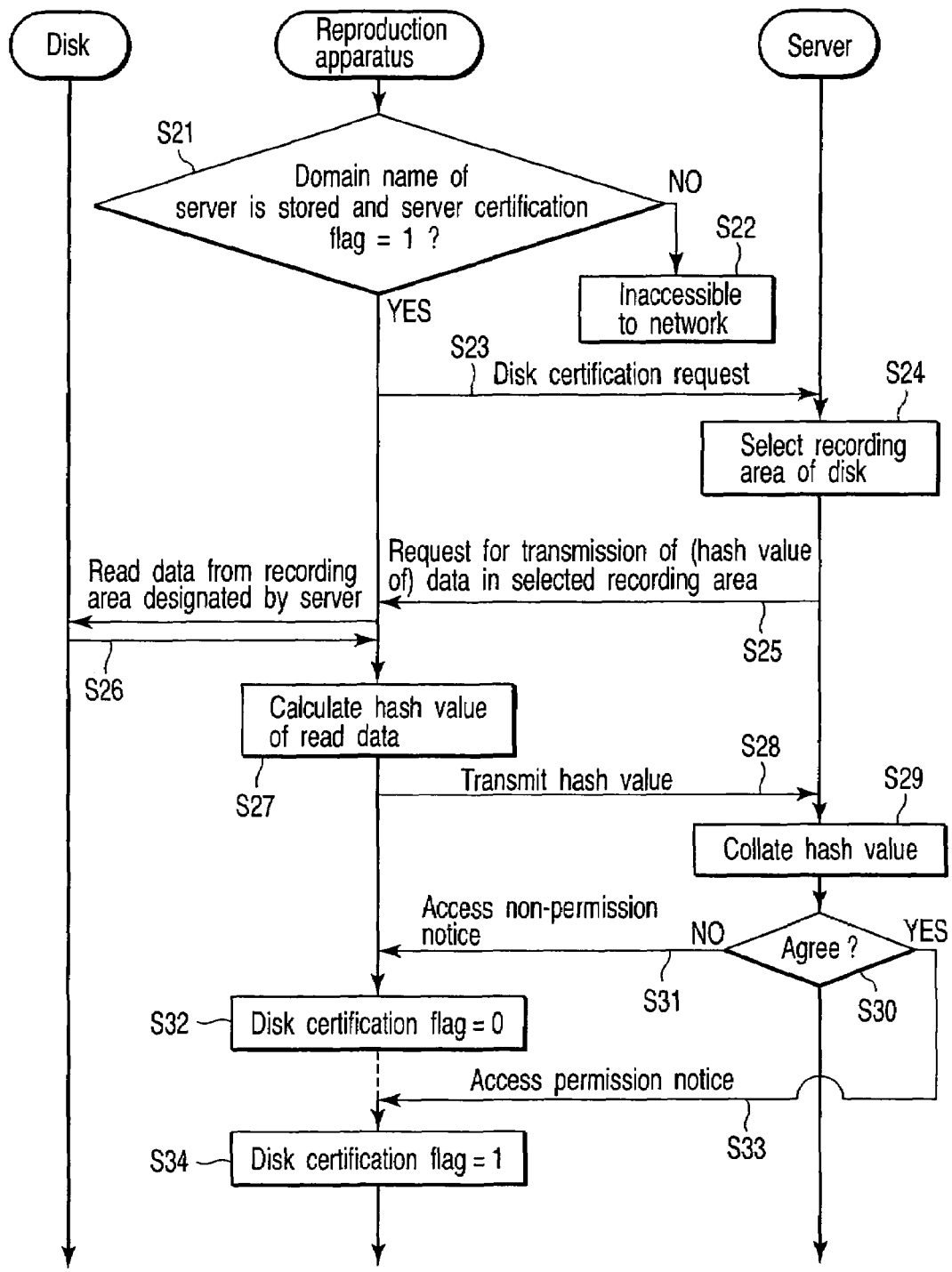
FIG. 5 is a flowchart showing a disk certification processing operation.
Figure 6:
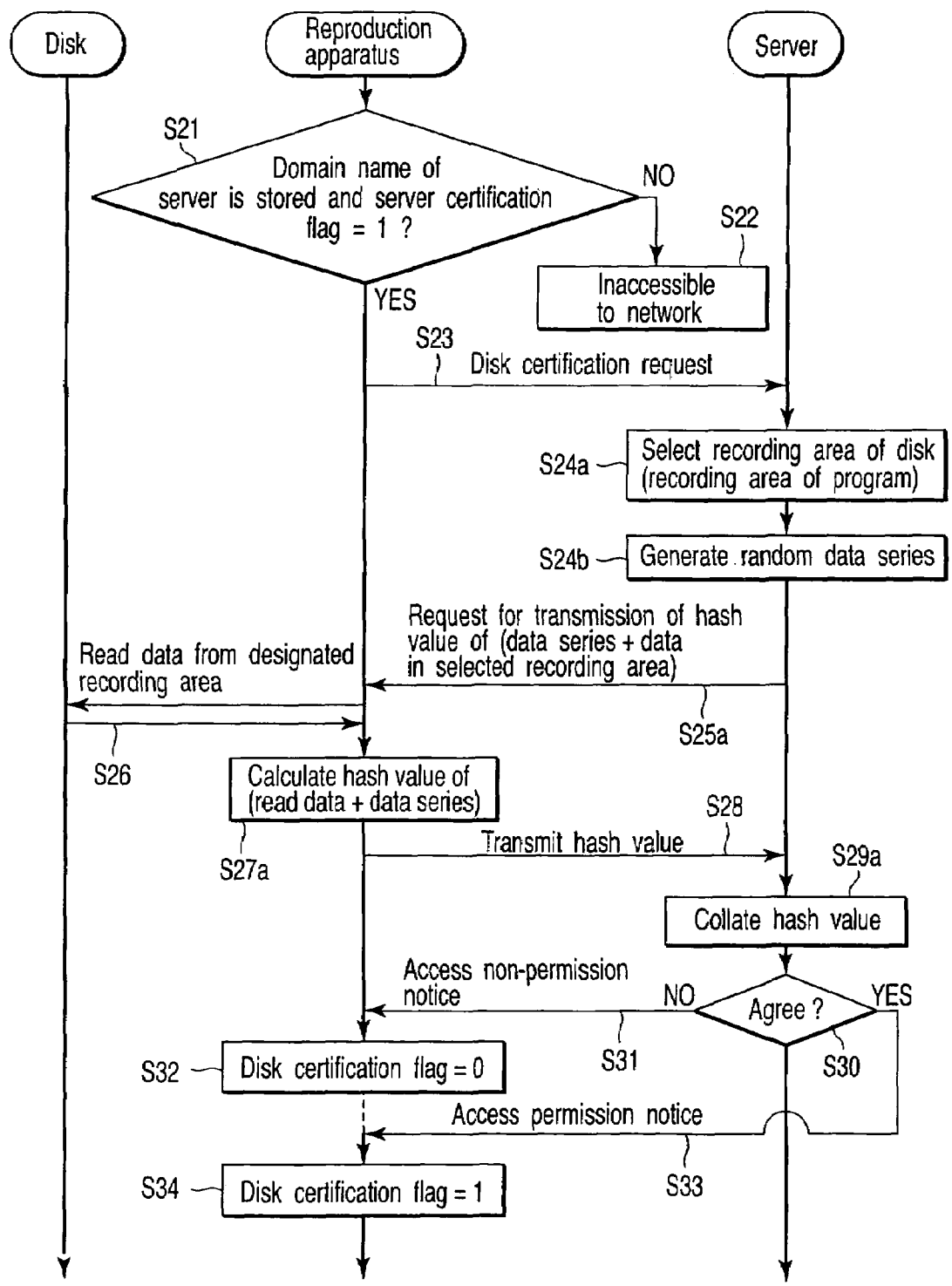
FIG. 6 is a flowchart showing another disk certification processing operation.

That is, the step S24 of FIG. 5 is replaced with steps S24a and S24b in FIG. 6, the step S25 of FIG. 5 is replaced with step S25a in FIG. 6, the step S27 of FIG. 5 is replaced with step S27a in FIG. 6, and the step S29 of FIG. 5 is replaced with step S29a in FIG. 6.

On receiving the disk certification request, in the step S24a of FIG. 6, the server selects the recording area of the disk in which the program having the possibility of harming the other program if tampered is recorded. In this case, as to the disk in which the content data corresponding to the server is recorded, the server stores beforehand the recording area in which the program (program having the possibility of harming the other program if tampered) is recorded. The server selects at least one of the recording areas in which the programs are recorded. A plurality of recording areas may be selected.

Next, in the step S24b, the server generates a random data series. In the step S25a, the content reproduction apparatus 100 is requested to transmit the hash value calculated from the generated data series and the data (program data) recorded in the recording area selected in the step S24a. In this case, the value may be requested to be encrypted using the predetermined algorithm before transmitted.

When the content reproduction apparatus 100 receives this transmission request, the disk certification unit 24 reads the data of the recording area selected and designated by the server via the disk controller 1 (step S26). In the step S27a, the read data is combined with the data series sent from the server to calculate the hash value of the whole data including the read data and the data series sent from the server. The obtained hash value is sent to the server (step S28).

The server is provided with the valid disk in which the content data corresponding to the server is recorded. In the step S29a, the server which has received the hash value reads the data from the recording area of the disk selected in the step S24a, and combines the read data with the data series generated in the step S24b to calculate the hash value from the whole data including the read data and the data series generated in the step S24b. Moreover, this calculated hash value is compared with the hash value received from the content reproduction apparatus (step S29). Thereafter, in the same manner as in FIG. 5, when both of them disagree (disk certification fails) and the disc is determined not to be valid, the server transmits the access non-permission notice to the content reproduction apparatus 100 (step S31), and the content reproduction apparatus sets the disk certification flag to "0" (step S32). When the hash value calculated by the server agrees with the hash value received from the content reproduction apparatus (disk certification is successful) and the disc is determined to be valid, the server transmits the access permission notice to the content reproduction apparatus 100 (step S33), and the content reproduction apparatus sets the disk certification flag to "1" (step S34).

The disk certification is valid until the disk is taken out of the content reproduction apparatus. That is, when the disk is removed from the content reproduction apparatus 100, the disk certification flag is rewritten to "0".

In the above-described description, it is determined by the disk certification flag whether or not the disk is valid. There will be described hereinafter a method in which a valid period (period for which the validity of the disk is assured) designated by the server and a session identifier are used. This can be realized using Cookie in a case where, for example, a hyper text transfer protocol (HTTP) is used as a communication protocol.

In step S33 of FIG. 5 or 6, the server transmits to the disk certification unit 24 the valid period (designated as, for example, "300 seconds") and the session identifier (e.g., random character string generated by the server to identify the content reproduction apparatus) together with the access permission notice. The disk certification unit 24 stores the valid period and the session identifier sent from the server in the destination management table stored in the destination management unit 24. Subsequently, in a case where the apparatus communicates with the server in step S54 shown in FIG. 9, when the session identifier is added to communication data to the server, the server can recognize that the disk is determined to be valid by performing the disc certification. When the communication data to which any session identifier is not added is sent from the content reproduction apparatus 100, the server rejects the data.

The disk certification unit 24 sets a value of the stored valid period to "0", deletes the session identifier, and rewrite the disk certification flag from "1" to "0", when the stored valid period elapses or in accordance with an operation of the content reproduction apparatus (e.g., in a case where a user removes the disk or the content being reproduced is stopped).

After the stored valid period elapses or the valid period turns to "0" by means of the predetermined user operation, the above-described disk certification is performed again, when the valid period turns to "0" or the request for access to the network is occurred during the reproduction and execution of the content data.

Figure 9:
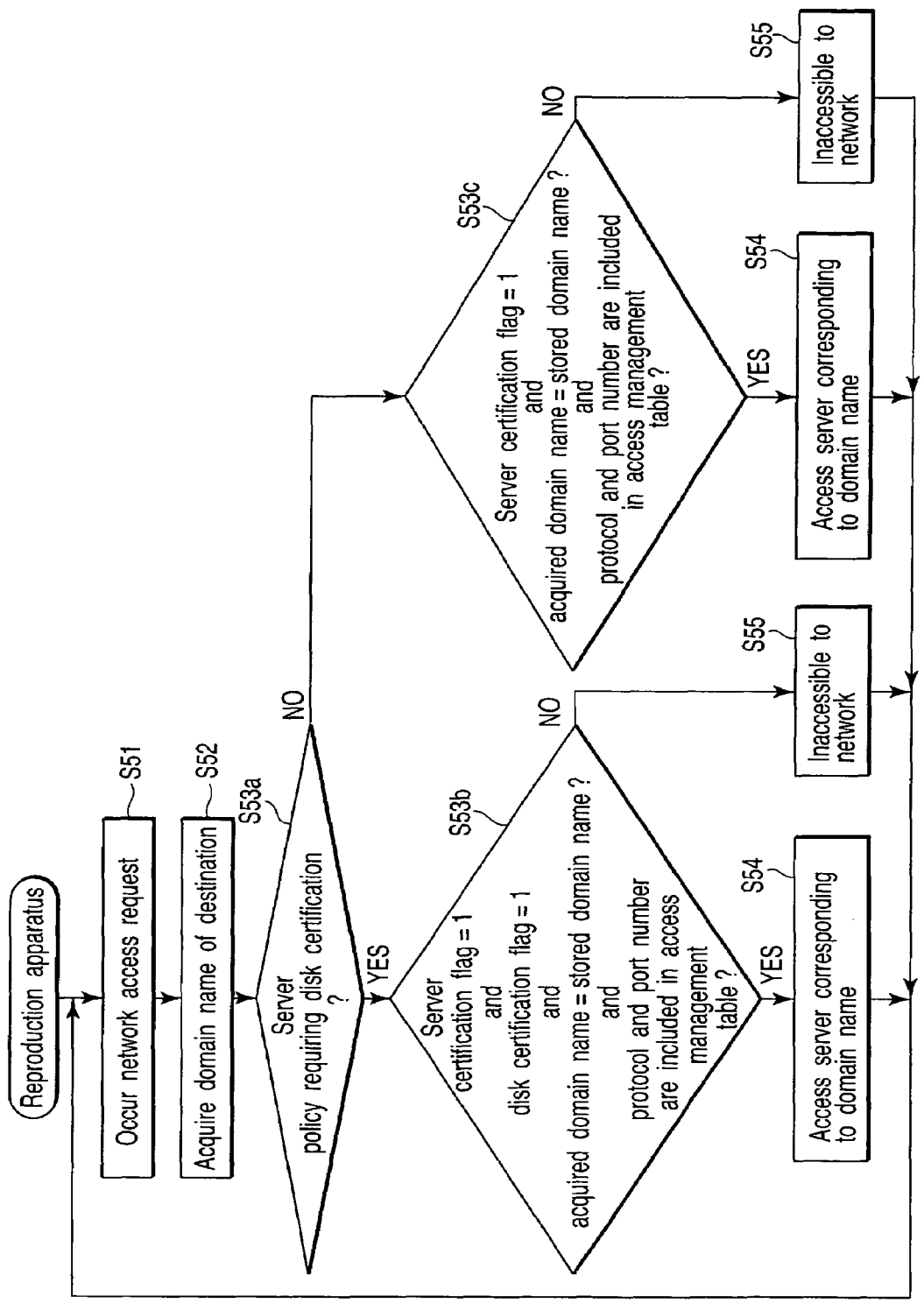
FIG. 9 is a flowchart showing a processing operation of the content reproduction apparatus when the network access request is occurred during disk reproduction.

Moreover, in a case where the stored session identifier is deleted, since it is not possible to communicate with the server in the step S54 of FIG. 9, the content reproduction apparatus 100 performs the disk certification again.

In a case where the valid period is used in this manner, there is added a condition that the valid period is not "0" in step S53b of FIG. 9 in order to access the server on receiving the access request occurred during the reproduction and execution of the content data. In a case where the session identifier is used, there is added a condition that the session identifier is stored in step S53b of FIG. 9.

It is to be noted that in the present embodiment, it has been described that one server performs the disk certification processing corresponding to a certain content, but one server may perform a plurality of disk certification processing. In this case, for example, when an identifier to uniquely specify the disk or content is stored beforehand in the disk, and the identifier is read from the disk to transmit the identifier to the server during the disk certification, the server can specify the disk.

(2) There will be described a case where the server certification and the disk certification are performed at a time when a request for access to the server (network) is occurred after the disk is inserted into the content reproduction apparatus, with reference to a flowchart shown in FIG. 7. It is to be noted that in FIG. 7, the same part as that of FIG. 2 is denoted with the same reference numeral, and an only different part will be described. That is, the step S2 of FIG. 2 is replaced with step S41 in FIG. 7.

In the server certification shown in FIG. 2, when the disk is inserted into the content reproduction apparatus in step S2, the disk readout unit 12 reads the domain name of the destination from the predetermined specific area of the disk (step S3).

Figure 7:
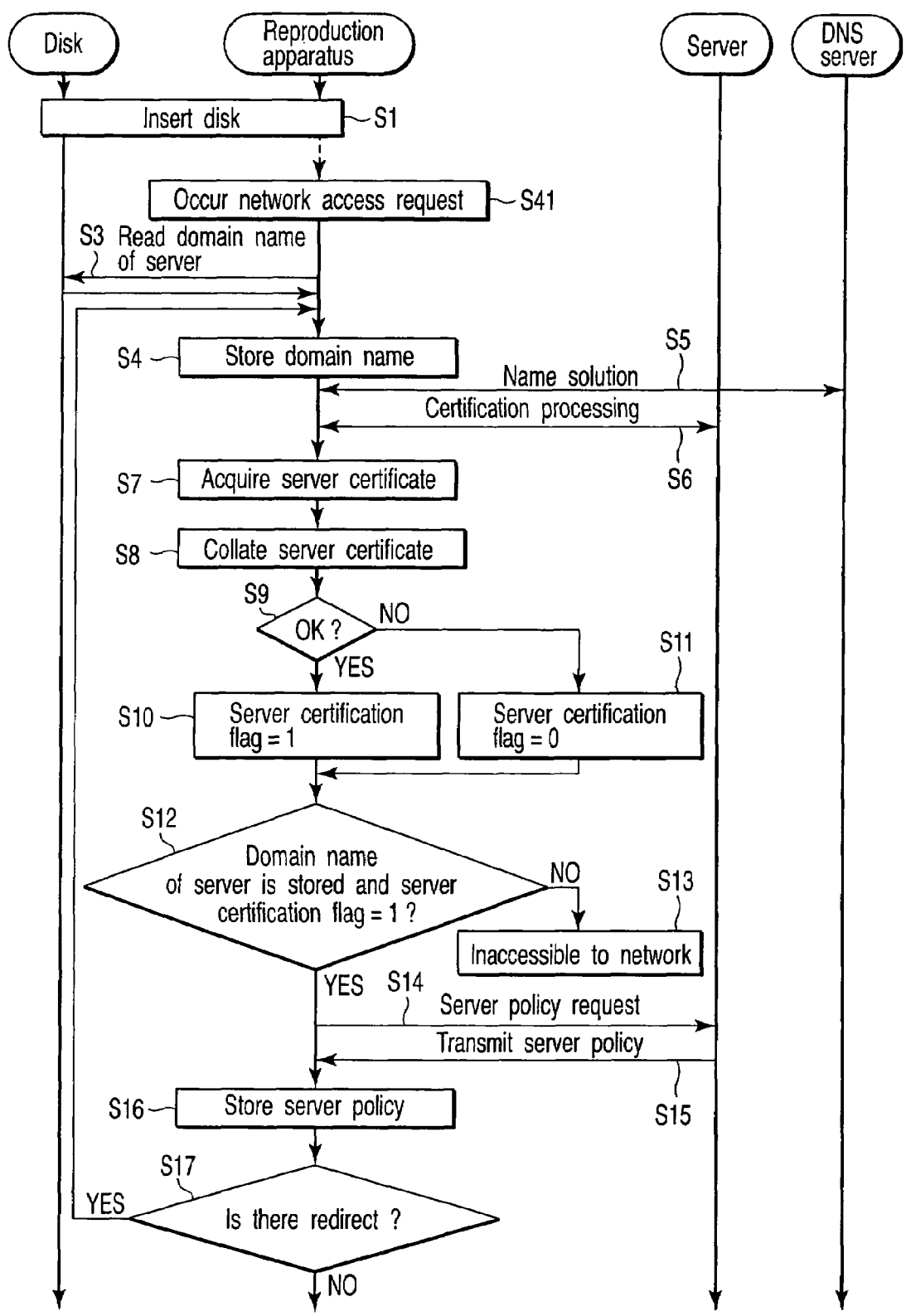
FIG. 7 is a flowchart showing another server certification processing operation (server certification performed at a time when a network access request is occurred)

On the other hand, in the server certification shown in FIG. 7, after the disk is inserted into the content reproduction apparatus, for example, when the program recorded in the disk is executed, and accordingly the request for access to the server (network) is (first) occurred in step S41, the disk readout unit 12 reads the domain name of the destination from the predetermined specific area of the disk (step S3). The subsequent processing operation is similar to that of the steps S4 to S17 of FIG. 2.

In a case where the disk certification is requested in the acquired server policy after the server certification processing of FIG. 7 is performed, the disk certification is performed as shown in FIG. 5 or 6.

It is to be noted that the processing operation of FIG. 7 may be combined with that shown in FIG. 4 for limiting the number of redirecting times.

(3) There will be described another example of the case where the server certification and the disk certification are performed at the time when the request for access to the server (network) is occurred after the disk is inserted into the content reproduction apparatus, with reference to a flowchart shown in FIG. 8. It is to be noted that in FIG. 8, the same parts as those of FIGS. 2 and 7 are denoted with the same reference numerals, and an only different part will be described. That is, in FIG. 8, in the same manner as in FIG. 2, when it is detected that the disk is inserted into the content reproduction apparatus (step S2), the disk readout unit 12 reads the domain name of the destination from the predetermined specific area of the disk (step S3). The read domain name is recorded in the destination management table stored in the memory of the destination management unit 21 and shown in FIG. 10 (step S4). The steps up to now are similar to those of FIG. 2.

Figure 8:
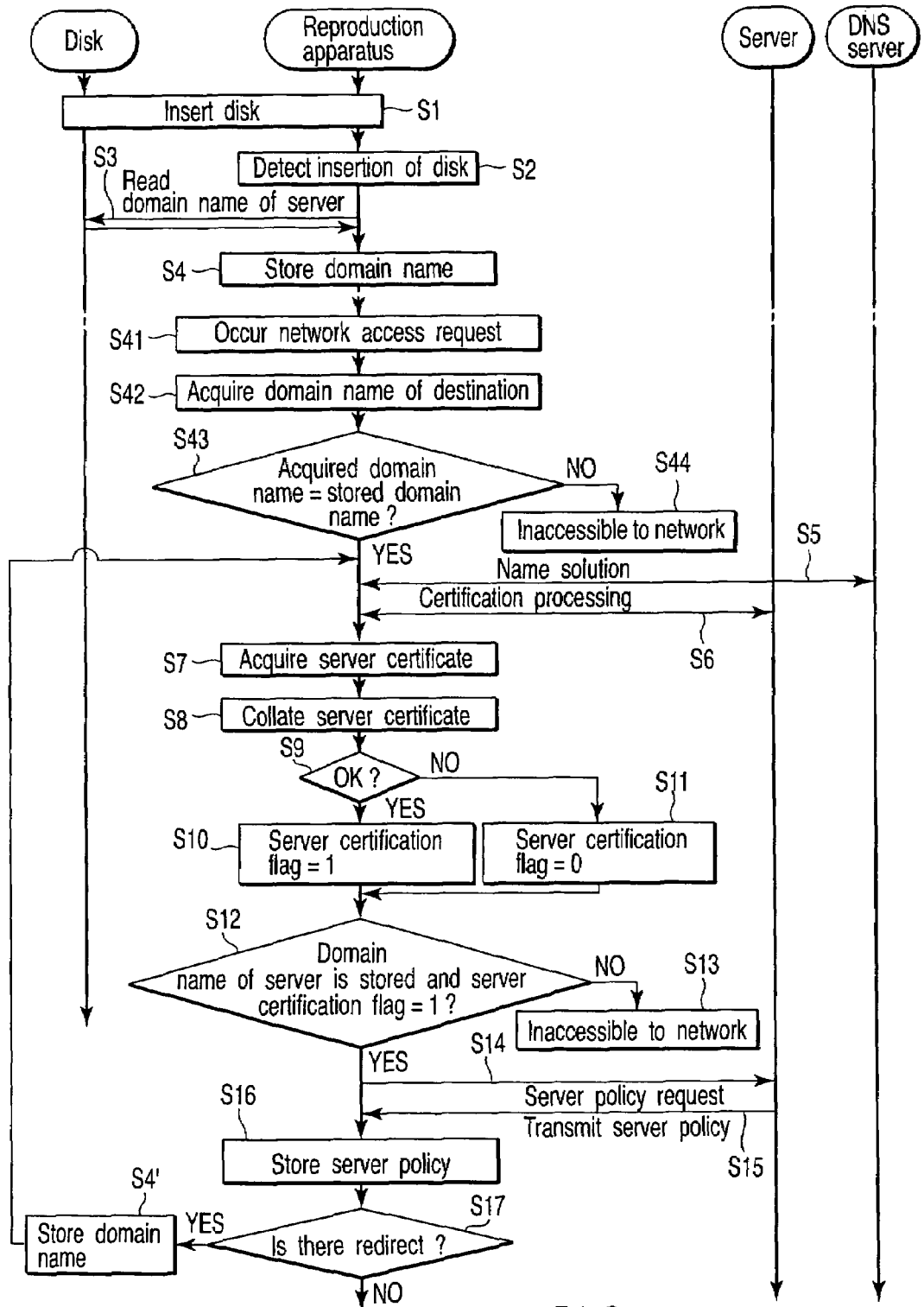
FIG. 8 is a flowchart showing still another server certification processing operation (server certification performed at a time when the network access request is occurred)

FIG. 8 is different from FIG. 2 in that processing of steps S5 to S11 by the server certification unit 23, and processing of steps S14 to S17, and step S4 by the server policy management unit 25 are performed after performing processing of steps S41 to S43 in FIG. 8. That is, in the disk detection unit 11, it is detected that the disk is inserted into the content reproduction apparatus, and the domain name read from the specific area of the disk is recorded in the destination management table (steps S1 to S4 of FIG. 8). Thereafter, when the program recorded in the disk inserted in the content reproduction apparatus is executed, and accordingly the request for access to the server (network) is (first) occurred, that is, when the access request is output from the reproduction/execution controller 3 (step S41 of FIG. 8), the access request is detected by the destination verification unit 22 of the network access controller 2. The destination verification unit 22 acquires the domain name of the destination designated by the access request (step S42).

The domain name of the destination included in the program on the disk executed by the reproduction and execution controller 3 and is included in the access request occurred by executing the program. The destination verification unit 22 acquires the domain name of the destination included in the access request.

Next, the destination verification unit 22 compares the acquired domain name with the domain name recorded in the destination management table (step S43). When both of them agree with each other, the server certification unit 23 starts certification processing (steps S5 to S11) of the server corresponding to the domain name recorded in the access management table. Thereafter, the server policy management unit 25 performs processing to acquire the server policy as shown in steps S12 to S17, and S4'.

It is to be noted that in a case where the acquired server policy includes a policy to request the redirect, the domain name of the new server designated by the policy is stored in the destination management table in step S4'.

When the acquired domain name is different from the domain name recorded in the destination management table in step S43, here the processing is stopped, and the server certification processing (steps S5 to S11) in the server certification unit 23 and the server policy acquisition processing (steps S12 to S17, S4') in the server policy management unit 25 are not performed. As a result, the content reproduction apparatus 100 does not access to the network.

When the acquired domain name agrees with the domain name recorded in the destination management table, the server certification unit 23 starts the certification processing (steps S5 to S11) of the server corresponding to the domain name recorded in the access management table in the same manner as in FIG. 2. That is, the server certification unit 23 acquires a certificate from the server corresponding to the domain name recorded in the access management table (steps S5 to S7). When the server name (domain name) included in the acquired certificate agrees with the server name (domain name) stored beforehand in the access management table and the server is determined to be valid, or when the acquired certificate agrees with the specific certificate stored beforehand in a memory included in the server certification unit 23 and the server is determined to be valid, the server certification flag in the access management table is set to "1" (steps S8 to S10).

When the server name (domain name) included in the acquired certificate is different from the server name (domain name) stored beforehand in the access management table and the server is determined not to be valid, the server certification flag in the access management table is set to "0" (steps S8, S9, and S11).

Thereafter, the server policy management unit 25 acquires the server policy from the server (steps S12 to S15), and stores the policy in the server policy table (step S16). When the acquired policy includes the server policy to request the redirect (step S17), the domain name of the new server included in the policy is stored in the destination management table (step S4'). Moreover, the server certification unit 23 performs the server certification processing with respect to the server corresponding to the newest domain name stored in the step S4' (steps S5 to S11).

The disk certification is performed as shown in FIG. 5 or 6 in a case where the disk certification is requested in the acquired server policy after performing the server certification processing of FIG. 8.

It is to be noted that the processing operation of FIG. 8 may be combined with that of FIG. 4 for limiting the number of redirecting times.

In the present embodiment, the disk certification processing is performed in a case where the server certification and the server policies are acquired, and the acquired server policies includes the server policy to request the disk certification (1) when the disk is inserted into the content reproduction apparatus or (2) when the request for access to the server (network) is occurred. In this case, when disk replacement cannot be detected owing to a defect of the content reproduction apparatus or the like, there is a danger that the disk is replaced with another disk after the disk certification processing.

In this case, since the domain name, the server certification flag, and the disk certification flag stored in the destination management table are not deleted, the program stored in the replacing disk can access the server having the domain name stored in the destination management table.

To avoid the danger, after completion of the disk certification processing, the disk certification unit 24 of the network access controller may repeatedly execute the disk certification processing at a certain timing (e.g., periodically or irregularly based on a random number).

(4) Access Control for Limiting Access Method to Server

As shown in FIGS. 2 and 8, when the disk is inserted into the content reproduction apparatus 100, the apparatus reads the domain name recorded in the specific area of the disk to store the domain name in the destination management table. In FIG. 2, when the server certification is performed and the server policies are acquired, and the server policy to request the disk certification is acquired, the disk certification is performed; the server certification flag and the disk certification flag are set to "1" or "0".

Next, there will be described a case where the network access request is occurred at a time when the content reproduction apparatus 100 reproduces the content data of the inserted disk with reference to a flowchart shown in FIG. 9.

After the disk is inserted into the content reproduction apparatus, the network access request is occurred (a) when the program recorded in the corresponding disk is executed or (b) when the data or the program downloaded from the network (server) already stored in the memory unit 6 is reproduced or executed while executing the program recorded in the disk.

The network access request is detected by the destination verification unit 22 of the network access controller 2 in the same manner as described above (step S51). The network access request includes the domain name of the destination and the access method (socket, communication protocol, port number or the like) to the server.

The destination verification unit 22 acquires the domain name included on the network access request (step S52).

It is to be noted that to perform the server certification shown in FIG. 8, when the network access request is detected (step S41 of FIG. 8) and the domain name of the destination is acquired (step S42 of FIG. 8) in the steps S51 and S52 after inserting the disk, the server certification is started. Furthermore, when the server policies are acquired and the server policy to request the disk certification is acquired, the disk certification is performed; the server certification flag and the disk certification flag are set to "1" or "0".

Moreover, to perform the server certification processing shown in FIG. 7, in the steps S51 and S52, when the network access request is first detected after inserting the disk (step S41 of FIG. 7), the domain name recorded in the specific area of the disk is read, and stored in the destination management table (steps S3 and S4 of FIG. 7). Thereafter, when the server policies are acquired and the server policy to request the disk certification is acquired, the disk certification is performed; the server certification flag and the disk certification flag are set to "1" or "0".

Therefore, in a case where the network access request is detected, and the domain name of the destination is acquired in the steps S51 and S52 of FIG. 9, in any of FIGS. 2, 7, and 8, the domain name is recorded in the destination management table. When the server policy to request the server certification or the disk certification is acquired, the server certification flag and the disk certification flag are set to "1" or "0".

Additionally, when the server is redirected, a domain name of the domain name of the server designated is stored in the destination management table. When the server policy to designate access method such as the communication protocol or the port number is acquired, an access method such as the communication protocol or the port number is stored in the server policy table.

In a case where the server policy to request the disk certification is stored in the server policy table (step S53a), when all of the first to third conditions are satisfied, or when all of the first to fourth conditions are satisfied in case of acquiring the server policy to designate the access method, the destination verification unit 22 permit the access to the server corresponding to the domain name recorded in the destination management table (step S53b).

The first condition is that the server certification flag (after the redirect at a time when the redirect is performed) is "1". The second condition is that the disk certification flag is "1". The third condition is that the domain name (included in the access request) acquired from a network access requester in the step S52 agree with the domain name (domain name read from the specific area of the disk) recorded in the destination management table. The fourth condition is that the access method (protocol, port number, socket or the like) included in the access request be included in the access method (protocol, port number, socket or the like) recorded in the server policy table, are satisfied in the case of acquiring the server policy to designate the access method.

When any of the first to third conditions is not satisfied, or in the case of acquiring the server policy to designate the access method, when any of the first to fourth conditions is not satisfied, the access to the network is not permitted (steps S53b, S55).

Moreover, in case where the server policy to request the disk certification is not stored in the server policy table (step S53a), when (first condition) the value of the server certification flag (after the redirect at a time when the redirect is performed) is "1", and (second condition) the domain name (included in the access request) acquired from the network access requester in the step S52 agrees with the domain name (domain name read from the specific area of the disk) recorded in the destination management table, the destination verification unit 22 permits the access to the server corresponding to the domain name recorded in the destination management table is permitted (step S53c). In case of acquiring the server policy to designate the access method, when the first to second conditions are satisfied and (third condition) the access method (protocol and port number) included in the access request is included in the access method (protocol and port number) recorded in the server policy table, the destination verification unit 22 permits the access to the server corresponding to the domain name recorded in the destination management table is permitted (step S53c).

When any of the first to second conditions is not satisfied, or in the case of acquiring the server policy to designate the access method, when any of the first to third conditions is not satisfied, the access to the network is not permitted (steps S53c, S55).

In a case where the access to the network is permitted in the destination verification unit 22, the communication unit 4 accesses the server corresponding to the newest domain name (the last added domain name in a case where the domain name is added by means of the redirect) recorded in the access management table, and the data, the program or the like for use in reproducing and executing the content data of the disk is received from the server via the communication unit 4 (step S54). The received data, program or the like is output to the reproduction/execution controller 3 via the network access controller 2. As a result, the reproduction/execution controller 3 of the content reproduction apparatus 100 reproduces or executes the content data in the disk while communicating with the server (using the data or the program downloaded from the server).

It is to be noted that the network access request occurred when the storage controller 5 writes the data into the memory unit 6 or reads the data from the memory unit 6 during reproducing and executing the content data on the inserted disk by the content reproduction apparatus 100.

For example, the network access request is occurred when the server generates the certificate of the data to be written into the memory unit 6 by the storage controller 5, encrypts the data to be written into the memory unit 6 by the storage controller 5, verifies the certificate of the data read from the memory unit 6 by the storage controller 5, and decrypts the data read from the memory unit 6 by the storage controller 5.

As to whether or not the access to the server is necessary when the storage controller 5 writes the data into the memory unit 6 or read the data from the memory unit 6, the necessity may be designated as the server policy of the server.

(5) The data distributed from the server is selected based on a date notified from the content reproduction apparatus.

It is to be noted that to request the server policy in the step S14 of FIG. 2 or 4, the date (insertion date) when the disk is inserted into the content reproduction apparatus 100 or a reproduction start date of the disk inserted into the content reproduction apparatus 100 is notified (e.g., the above-described date is transmitted together with the request of the server policy), and the server may change its operation in accordance with the date. In this case, the server which has received date data such as the insertion date or the reproduction start date compares the received date with an update date of the content held by the server. When the date data sent from the server is older than the update date of the content, the content before updated is provided. As described above, it is possible to provide an appropriate content to the content reproduction apparatus in response to a timing to update the content in the server, and display the content.

That is, when the content reproduction apparatus executes the program on the disk, the request for access to the network is occurred, the server is accessed as shown in FIG. 9, and the content data, the program or the like is downloaded from the server. In this case, the server selects the content data or the program to be downloaded based on the date data transmitted from the content reproduction apparatus 100 in the step S14 and transmits the selected data or the program to the content reproduction apparatus 100.

If the content of the server is updated while a viewer reproduces and appreciates the content data in the disk, there is a possibility that contradiction is generated in story. Therefore, when the content reproduction apparatus and the server are configured as described above, the server can determine the distribution data and program depending on the disk insertion date or the reproduction date to avoid the contradiction.

(6) As described above, in the content reproduction apparatus 100, the server certification is performed and the server policies are acquired. In a case where the server policy to request the disk certification is acquired, the disk certification is performed. Furthermore, the access control shown in FIG. 9 is performed to limit the accessible server, when the network access request is occurred, to the server corresponding to the domain name recorded in the specific area of the disk inserted into the content reproduction apparatus 100 or the newest server designated by the server policy to request redirect. Moreover, the method of accessing the server is limited to the only access method designated by the server. Furthermore, the disk accessible to the server is limited to the only disk determined to be valid. Accordingly, the content reproduction apparatus is prevented from becoming a stepping-stone for DDoS attack or the like.

It is to be noted that in the present embodiment, it has been described that there is one-to-one correspondence between the disk and the server, and one domain name of the server is assumed to be stored in the specific area of the disk. However, in a case where a domain name list listing a plurality of server domain names is stored in the specific area of the disk, the disk readout unit 12 reads the domain name list from the specific area to store the list in the destination management table of the destination management unit 21 in the same manner as in a case where one domain name is stored in the above-described specific area. In this case, the identifier of each server described in the domain name list is subjected to the above-described server certification processing, server policy acquisition, disk certification processing, and access control processing.

For example, when the disk is inserted or the request for the access to the network is occurred, the disk readout unit 12 reads the domain name list from the specific area of the disk to store the list beforehand in the destination management table (step S4).

The server certification (steps S5 to S11) may be performed with respect to each domain name of the domain name list immediately after the list is read out. When the request for the access to the network is occurred during executing the program included in the content on the disc, and the domain name (included in the program) designated by the access request is included in the domain name list, the server corresponding to the domain name may be subjected to the above-described server certification. When the server is determined to be valid as a result of the server certification, the server policy is further acquired.

When the domain name (included in the program) designated by the access request is included in the domain name list, the server certification flag of the server corresponding to the domain name is "1", and the server policy to request the disk certification that is acquired from the server is stored in the server policy table, the disk certification is requested with respect to the server (the newest server when the redirect is performed) corresponding to the domain name, and the disk certification is performed (steps S23 to S34).

When the disk detection unit 11 detects that the disk has been inserted, the destination management unit 21 reads the domain name from the specific area of the disk, and the domain name is stored in the destination management table. However, when the disk detection unit 11 detects that the disk has been removed, the destination management unit 21 deletes, from the destination management table, all of the domain name including the domain names designated by the server policy to request redirect. Moreover, when the communication between the content reproduction apparatus and the server corresponding to the domain name stored in the destination management table, or the server designated by the server policy to request the redirect is disconnected for a certain reason, all of the domain names are deleted from the destination management table. Furthermore, when the server certification flag and the disk certification flag stored in the destination management table indicate "1", they may be rewritten into "0".

According to the content reproduction apparatus in the present embodiment, the identifier indicating the accessible server on the network and the content data including the program are recorded on the recording medium. The identifier is read from the recording medium and it is determined whether the server corresponding to the identifier is valid by performing server certification. From the server determined to be valid, there is received at least one of: the first server policy to request for redirecting to another server on the network; the second server policy to request the disk certification; and the third server policy to designate the method of accessing the server. When the access request is detected during the reproduction or the execution of the recording medium, the access to the server is controlled in accordance with the received server policy, there can be easily controlled: the limiting of the server to be accessed during the reproduction or the execution of the disk to the server corresponding to the domain name stored in the specific area of the disk and the server designated by the server policy to request redirect; the limiting of the method of accessing the server; the limiting the disk accessible to the server to the disk determined to be valid; or the like. In consequence, it is possible to avoid the access to the illegal network in a case where the tampered program on the disk is executed.

Since the validity of the server on the network or the disk is verified, it is possible to securely acquire or reproduce video information related to the content on the disk via the internet. Since the accessible server is limited, a maliciously prepared dangerous content cannot be connected to the unspecified number of the servers. Therefore, the apparatus can be prevented from becoming the steppingstone for DDoS attack. Therefore, it is possible to avoid damages caused by reproducing the dangerous content, and it is also possible to prevent the apparatus from becoming a perpetrator of attack on another server.

The technology of the present invention described in the embodiment of the present invention can be stored and distributed as a program executable by a computer in a recording medium such as a magnetic disk (flexible disk, hard disk or the like), an optical disk (CD-ROM, DVD or the like), or a semiconductor memory For example, the computer is provided with: reproduction/execution means (disk controller 1, reproduction/execution controller 3) for reproducing and executing the content data stored in the recording medium which stores the content data including the video/sound data and the program and which stores the identifier indicating the server on the network in the predetermined specific storage area; storage means; and the communication unit 4. When the computer executes the program for allowing the computer to realize the functions of the network access controller 2 and the storage controller 6, the content reproduction apparatus of FIG. 1 can be realized.

The present invention is applied to a content reproduction apparatus which reproduces and executes content data including video/audio information and a program recorded on a recording medium such as an optical disk.

What is claimed is:

1. A content reproduction apparatus comprising:
 a reproduction unit configured to read a first server identifier, from a recording medium storing the first server identifier and a content data item including a destination identifier, and reproduce the content data item, to generate an access request including the destination identifier while reproducing the content data item;
 a table to store the first server identifier read from the recording medium;
 a server certification unit;
 a policy management unit configured to acquire a first server policy from a first server which corresponds to the first server identifier and is certified by the server certification unit, the first server policy including a second server identifier for redirecting to a second server, to store the second server identifier in the table;
 a detection unit configured to detect the access request;
 a determination unit configured to determine to allow access when the destination identifier included in the access request is equal to the first identifier stored in the table and the second server is certified by the server certification unit; and
 an accessing unit configured to access to the second server responding to the access request when the network access is allowed.

2. The content reproduction apparatus according to claim 1, further comprising:
 the policy management unit configured to acquire a second server policy from the second server being certified by the server certification unit, a second server policy requesting for certifying the recording medium;
 a recording medium certification unit configured to certify the recording medium by use of a data item in a storage area of the recording medium designated by the second server being certified; and wherein the determination unit determines to allow the network access, when the destination identifier is equal to the first identifier stored in the table, the second server is certified by the server certification unit and the recording medium is certified by the recording medium certification unit.

3. The content reproduction apparatus according to claim 1, further comprising:
the policy management unit configured to acquire a third server policy, from the second server being certified by the server certification unit, the third server policy designating a access method for accessing the second server; and
wherein the access request includes an access method information item, and
the determination unit determines to allow the network access, when the destination identifier is equal to the first identifier, the second server is certified, and the access method information item includes the access method designated by the third server policy.

4. The content reproduction apparatus according to claim 3, further comprising:
the policy management unit configured to acquire a second server policy from the second server being certified by the server certification unit, a second policy requesting for certifying the recording medium;
a recording medium certification unit configured to certify the recording medium by use of a data item in a storage area of the recording medium designated by the second server being certified; and
wherein the determination unit determines to allow the network access, when the destination identifier is equal to the first identifier, the second server and the recording medium is certified by the server certification unit, the recording medium is certified by the recording medium certification unit, and the access method information item includes the access method designated by the third server policy.

5. The content reproduction apparatus according to claim 1, further comprising:
a counter configured to increment a counter value by 1, when the first server policy is acquired; and
wherein the server certification unit certifies the second server when the counter value is less than or equal to a predetermined threshold value.

6. A content reproduction apparatus comprising:
a reproduction unit configured to read a first server identifier, from a recording medium storing the first server identifier and a content data item including a destination identifier, and reproduce the content data item, to generate an access request including the destination identifier while reproducing the content data item;
a table to store the first server identifier read from the recording medium;
a server certification unit configured to certify a first server corresponding to the first sever identifier;
a policy management unit configured to acquire a first server policy from a first server which corresponds to the first server identifier and is certified by the server certification unit, the first server policy including a second server identifier redirecting to a second server, to store the second server identifier in the table;
a counter configured to increment a counter value by 1, when the first server policy is acquired;
the server certification unit configured to certify the second server when the counter value is less than or equal to a predetermined threshold value;

the policy management unit configured to acquire a second server policy from the second server being certified, the second server policy including a third server identifier redirecting to a third server, to store the third server identifier to the table;
the counter configured to increment the counter value by 1, when the third server policy is received;
ther server certification unit configured to certify the third server when the counter value is less than or equal to the predetermined threshold value;
a detection unit configured to detect the access request;
a determination unit configured to determine to allow network access when the destination identifier included in the access request is equal to the first identifier stored in the table and the third server is certified by the ther4 server certification unit; and
an accessing unit configured to access the third server responding to the access request when the network access is allowed.

7. A content reproduction method for a content reproduction apparatus including:
a reproduction unit configured to read a first server identifier, from a recording medium storing the first server identifier and a content data item including a destination identifier, and reproduce the content data item to generate an access request including the destination identifier while reproducing the content data item, the content reproduction method comprising:
storing the first server identifier in a table;
certifying a first server corresponding to the first server identifier;
acquiring a first server policy from the first server being certified, the first server policy including a second server identifier redirecting to a second server, to store the second server identifier in the table;
certifying the second server;
detecting the access request;
determining to allow network access when the destination identifier included in the access request is equal to the first identifier stored in the table and the second server is certified; and
accessing to the second server responding to the access request, when the network access is allowed.

8. The content reproduction method according to claim 7, further comprising:
acquiring, from the second server being certified, a second server policy requesting for certifying the recording medium;
certifying the recording medium by use of a data item in a storage area of the recording medium designated by the second server being certified; and
wherein determining determines to allow network access, when the destination identifier is equal to the first identifier, and the second server and the recording medium is certified.

9. The content reproduction method according to claim 7, further comprising:
acquiring, from the second server being certified, a third server policy designating a access method for accessing the second server,
wherein the access request includes an access method information item;
determining determines to allow network access when the destination identifier is equal to the first identifier, the second server is certified, and the access method information item includes the access method designated by the third server policy.

10. The content reproduction method according to claim 9, further comprising:
    acquiring, from the second server being certified, a second policy requesting for certifying the recording medium; and
    certifying the recording medium by use of a data item in a storage area of the recording medium designated by the second server being certified,
    wherein the determining determines to allow the network access when the destination identifier is equal to the first identifier, the second server and the recording medium is certified, and the access method information item includes the access method designated by the second server being certified.

11. The content reproduction method according to claim 7, further comprising:
    incrementing a counter by 1, when the first server policy is received; and
    wherein the certifying the second server certifies the second server when a value of the counter is less than or equal to a predetermined threshold value.

12. A content reproduction method for a content reproduction apparatus including:
    a reproduction unit configured to read a first server identifier, from a recording medium storing the first server identifier and a content data item including a destination identifier, and reproduce the content data item to generate an access request including the destination identifier while reproducing the content data item, the content reproduction method comprising:
    storing the first server identifier in a table;
    certifying a first server corresponding to the first sever identifier;
    acquiring a first server policy from the first server being certified, the first server policy including a second server identifier redirecting to a second server, to store the second server identifier to the table;
    incrementing a counter by 1, when the first server policy is received;
    certifying the second server when a value of the counter is less than or equal to a predetermined threshold value;
    acquiring a second server policy from the second server being certified, the second server policy including a third server identifier redirecting to a third server, to store the third server identifier to the table;
    incrementing the counter by 1, when the third server policy is received;
    certifying the third server when the value of the counter is less than or equal to the threshold value;
    detecting the access request;
    determining to allow network access when the destination identifier included in the access request is equal to the first identifier stored in the table and the third server is certified; and
    accessing to the third server responding to the access request when the network access is allowed.

13. The content reproduction method according to claim 7, further comprising:
    notifying the second server being certified, a date when the recording medium is inserted into the reproduction unit or a date when the reproduction unit starts reproducing the content data item; and
    receiving, from the second server being accessed, data item selected based on the date.

* * * * *